US010922277B1

United States Patent
De Souter et al.

(10) Patent No.: US 10,922,277 B1
(45) Date of Patent: Feb. 16, 2021

(54) LOGGING FILE SYSTEM METADATA CHANGES USING A SINGLE LOG HOLD PER CACHED BLOCK OF METADATA

(71) Applicant: EMC Corporation, Hopkinton, MA (US)

(72) Inventors: Marc De Souter, Wayne, NJ (US); Pranit Sethi, Piscataway, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 870 days.

(21) Appl. No.: 14/753,421

(22) Filed: Jun. 29, 2015

(51) Int. Cl.
*G06F 16/17* (2019.01)
*G06F 16/182* (2019.01)

(52) U.S. Cl.
CPC ........ *G06F 16/1734* (2019.01); *G06F 16/182* (2019.01)

(58) Field of Classification Search
CPC ......... G06F 17/30144; G06F 17/30194; G06F 17/30; G06F 16/1734; G06F 16/182
USPC ....................................................... 707/825
See application file for complete search history.

(56) References Cited

U.S. PATENT DOCUMENTS

| 7,631,009 B1 * | 12/2009 | Patel | G06F 11/1004 |
| 8,661,068 B1 * | 2/2014 | Seibel | G06F 16/172 |
| | | | 707/825 |
| 9,697,219 B1 * | 7/2017 | Wang | G06F 16/1734 |

OTHER PUBLICATIONS

Vahalia, Uresh, Metadata Logging in a NFS Server; Jan. 1995, www.Semanticscholar.org.*
Vahalia ("Metadata Logging in an NFS Server").*
Vahalia ("Metadata Logging in an NFS Server") (Year: 1993).*
Vahalia ("Metadata Logging in an NFS Server") (Year: 1993).*
Uresh Vahalia, et al.; "Metadata Logging in an NFS Server"; Proceedings of the Summer 1993; Usenix Technical Conference; Jun. 1993; pp. 111-128.

* cited by examiner

*Primary Examiner* — Hosain T Alam
*Assistant Examiner* — Tracy M McGhee
(74) *Attorney, Agent, or Firm* — BainwoodHuang (57) ABSTRACT

Logging changes to file system metadata using a single log hold per cached block of metadata. A metadata log including log entries is maintained in persistent storage, and each log entry in the metadata log contains metadata modified by a corresponding file system request. A single log hold is stored for each block of cached metadata. The single log hold for a given block of cached metadata indicates a file system request that modifies the metadata contained in the block, and that corresponds to a log entry located the closest, of all log entries corresponding to file system requests that modify metadata contained in the block, to a head of the metadata log.

19 Claims, 10 Drawing Sheets

LOGGING FILE SYSTEM METADATA CHANGES USING A SINGLE LOG HOLD PER CACHED BLOCK OF METADATA

BACKGROUND

As it is generally known, various types of storage services can be used to provide external data storage from storage server systems ("storage systems") to client computer systems ("client systems"). For example, storage systems may provide file-based storage services to client systems over a network. File-based storage services provide external storage to client systems in the form of externally stored files, so that the users of the client systems can access the files as if they were located on the local storage of the client system. Storage systems may use various protocols to provide file-based storage services to a client system, including but not limited to the Network File System (NFS) distributed file system protocol, the Server Message Block (SMB)/Common Internet File System (CIFS) application-layer network protocol, and/or Apple Filing Protocol (AFP).

In some examples, a storage system providing a file-based storage service may use a transaction log storing metadata changes resulting from file system requests received by the storage system. Such a metadata transaction log creates a log entry for each file system request, with each log entry used to record changes made to file system metadata objects, such as inodes, indirect blocks, allocation maps, etc., for the respective request. After the metadata changes for a request are persistently recorded in a log entry of the metadata log, the file system may return a completion indication for the request. Actual persistent metadata structures may be updated later to reflect the changes described in the log entry. In the event of a system crash, while the persistent metadata structures may contain stale data, the metadata log contains the metadata changes for those completed requests. The metadata log may accordingly be "replayed" to recover the file system to a consistent state after the system crash.

SUMMARY

In order to ensure correct operation, all metadata changes prescribed for a file system request associated with a given metadata log entry must be persisted prior to releasing that log entry from the log. To ensure that all metadata modifications for a given request had been persisted prior to releasing the corresponding log entry, previous systems created a list of "log holds" for each block of cached metadata to be changed. In such systems, the log hold list for each cached metadata block contained a log hold for each modification performed on metadata contained in that cache block for all active log entries. A reference counter was maintained for each request, and the reference counter was incremented for each metadata modification performed for that request. As each cache block of metadata was flushed to persistent storage, its log hold list was traversed to identify the complete set of requests (log entries) that had modified the metadata in the cache block, so that reference counters for those requests could be decremented by the number of modifications performed on that cache block, in order to indicate that the persistent metadata structures had been updated to reflect those modifications. When the reference counter for a given request had been decremented by all the metadata modifications made by that request, the reference counter would be zero, and the log entry corresponding to that request could be safely released.

As increasingly large numbers of modifications are performed on metadata in cached blocks of metadata prior to the blocks being flushed to persistent storage, the size of the log hold lists has increased to the point where system performance is degraded, due to the large memory footprint required to support the log hold lists. Traversing such very long log hold lists, sometimes including tens of thousands of log holds, for example, to remove log holds when a block is flushed, further negatively impacts system performance in terms of central processing unit (CPU) utilization.

To address these and other technical problems arising in previous technologies, a technique is disclosed for logging changes to file system metadata using a single log hold per cached block of metadata. In the disclosed technique, a metadata log is maintained in persistent storage, with each log entry in the metadata log containing metadata modified by a corresponding file system request. The disclosed technique stores a single log hold for each block of cached metadata.

In some examples, the metadata log has a head and a tail, new log entries are applied at the tail, and the head moves forward only when the dirty metadata blocks corresponding to that log entry at the head have been flushed to persistent storage. In such examples, the log entry at the head of the log is typically the oldest active log entry in the log. The single log hold for a given block of cached metadata corresponds to a log entry that is located the closest to a head of the metadata log, from among all log entries between the head and the tail that modify the metadata contained in the block. In this way, a single oldest log hold may be maintained for each block of cached metadata.

For example, the disclosed technique may process a first request, associated with a first log entry, by adding a log hold to a block of cached metadata modified by the first request. When processing a second request, which is associated with a second log entry and also modifies the block of cached metadata modified by the first request, the disclosed technique finds the log hold previously added to the block by processing the first request, and does not add a new log hold to the block, in response to detecting that a location of the first log entry is closer to the head of the metadata log than is a location of the second log entry, indicating that the first log entry is older than the second log entry.

In another example, when a request is processed that modifies a block of cached metadata that has a previously added log hold indicating another request, and the disclosed technique detects that the request being processed corresponds to a log entry located closer to the head of the metadata log than the log entry corresponding to the other request indicated by the previously added log entry, the disclosed technique releases the previously added log hold, and replaces it with a log hold indicating the current request. In this way, a single oldest log hold may be maintained for each block of cached metadata.

When the blocks of cached metadata are flushed from memory to persistent storage, the disclosed technique releases the single log hold for each block flushed. Log entries that correspond to file system requests for which all log holds have been released are retired from the head of the metadata log.

Embodiments of the disclosed technique may provide advantages over previous technologies. Embodiments of the disclosed technique may operate using significantly smaller numbers of log holds that were used in previous technologies. As a result, system performance may improve as a result of the smaller memory footprint required to support the log holds. Additionally, the single log holds used by the disclosed technique allow for more rapid traversal of the log holds, for example when removing the single log hold at the time a block is flushed, thus improving system performance in terms of central processing unit (CPU) utilization.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It is understood that such embodiments are provided by way of example to illustrate various features and principles of the invention, and that the invention hereof is broader than the specific examples of embodiments disclosed herein.

Figure 1:
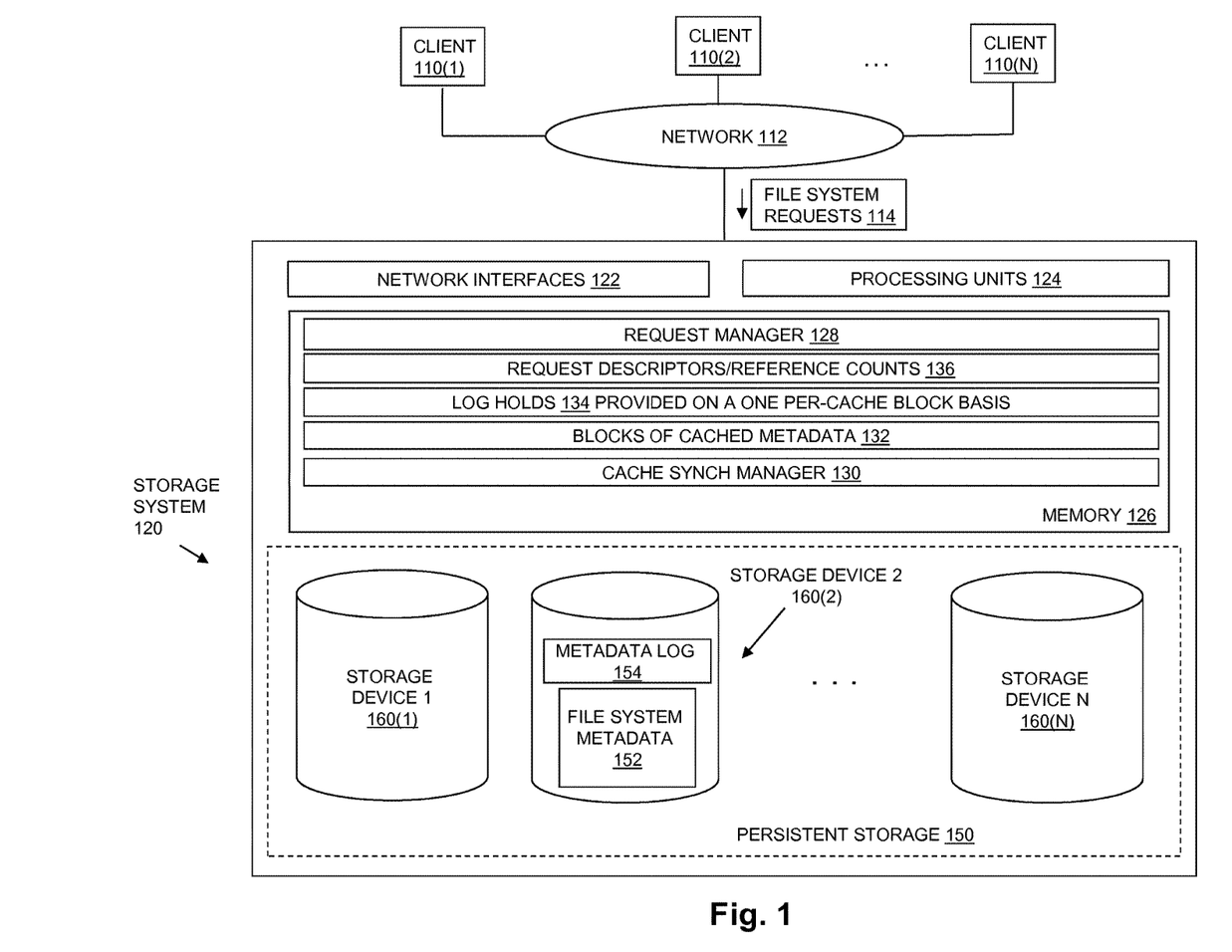
FIG. 1 is a block diagram showing an illustrative embodiment of the disclosed technique in an example of an operational environment.

FIG. 1 shows an illustrative embodiment in an example of an environment in which embodiments of the disclosed technique may operate. As shown in FIG. 1, multiple Client Machines 110(1) through 110(N) connect to a Storage System 120 over a Network 112. The Network 112 may, for example, include any specific type of communication network, such as the Internet, a WAN (Wide Area Network), a LAN (Local Area Network), or any combination of the foregoing.

The Storage System 120 includes one or more Network Interfaces 122 (e.g. adapters and/or network interface adapters for converting electronic and/or optical signals received over a Network 112 into electronic form for use by Storage System 120), a set of Processing Units 124 (e.g. one or more processing cores, chips, and/or assemblies), and Memory 126. The Memory 126 may, for example, include volatile memory (e.g., RAM), and/or another computer readable medium, for storing program code executable on the Processing Units 124, and for storing data operated on by such program code. The Processing Units 124 and the Memory 126 together form control circuitry, which is constructed and arranged to carry out various methods and functions as described herein. Also, the Memory 126 includes a variety of software constructs realized in the form of executable instructions. When the executable instructions are run by the set of Processing Units 124, the set of Processing Units 124 are caused to carry out the operations of the software constructs. Although certain software constructs are specifically shown and described, it is understood that the Memory 126 may include other software constructs, which are not shown, such as an operating system and various applications, and/or other processes or daemons.

Storage System 120 further includes Persistent Storage 150, shown for purposes of illustration including multiple Storage Devices 160(1) through 160(N), each of which may be embodied using any specific kind of data storage mechanism, including but not limited to one or more non-volatile storage devices, such as magnetic disk drives, electronic flash drives, and/or optical drives.

As further shown in FIG. 1, program code executable on the Processing Units 124 includes a Request Manager 128 that processes File System Requests 114 received from the Client Machines 110, and Cache Synch Manager 130 that flushes the Blocks of Cached Metadata 132 to Persistent Storage 150. Request Manager 128 and/or Cache Synch Manager 130 may, for example, be embodied using one or more independent threads or processes when executed on the Processing Units 124.

The Blocks of Cached Metadata 132 are blocks of metadata that are cached as needed from File System Metadata 152, for modification in Memory 126 during processing of File System Requests 114. The modified blocks of cached metadata are flushed (e.g. periodically) by Cache Synch Manager 130 back to File System Metadata 152.

File System Metadata 152 persistently stores metadata generated and/or used by the Storage System 120 while providing a file-based storage service to Client Machines 110. Such a file-based storage service may, for example, be provided using a distributed file system protocol such as Network File System (NFS). The File System Metadata 152 may, for example, include any specific type of file system metadata objects, including but not limited to inodes, indirect blocks, allocation maps, and/or any other specific file system metadata.

The Metadata Log 154 may include one or more log entries. Each log entry in the Metadata Log 154 corresponds to one of the File System Requests 114. For example, the File System Requests 114 for which log entries are added to Metadata Log 154 may include those NFS requests that can potentially modify file system metadata, such as setattr, write, link, symlink, create, remove, mkdir, rmdir, and rename NFS requests. Such requests that can potentially modify file system metadata may also be referred to as intrusive requests.

Each log entry in the Metadata Log 154 contains the metadata modified by the corresponding file system request. The beginning of the Metadata Log 154 is indicated by a log head pointer or the like, and may also be referred to as the "head" of the Metadata Log 154. Log entries are added to a "tail" of the Metadata Log 154, following the last log entry. The tail of the Metadata Log 154 may be indicated by a log tail pointer or the like.

Log entries may be added by Request Manager 128 to Metadata Log 154 in the order in which the corresponding file system requests are received. When the Request Manager 128 processes a file system request, the metadata modifications resulting from the request are first written to the log entry corresponding to the request. After the log entry has been written, the Storage System 120 may indicate a completed status for the request to the client that issued the request, and Request Manager 128 may store the metadata objects modified by the request into one or more of the Blocks of Cached Metadata 132, which will later be flushed out to their persistent representations in File System Metadata 152. Accordingly, the Metadata Log 154 persistently stores the metadata modifications made by all file system requests that have been indicated as completed to the Client Machines 110, but for which the resulting modified file metadata has not yet been flushed from Blocks of Cached Metadata 132 to File System Metadata 152. In the event of a system crash, Metadata Log 154 may accordingly be "replayed" starting from its head, in order to recover the file system to a consistent state, using the modified file system metadata stored in the Metadata Log 154.

The Log Holds 134 are data structures associated with individual blocks of cached metadata within the Blocks of Cached Metadata 132. Each of the Blocks of Cached Metadata 132 has a single one of the Log Holds 134 associated with it. The single log hold for a block of cached metadata indicates a file system request that i) modified the metadata contained in the block, and ii) that corresponds to a log entry in Metadata Log 154 that is located the closest, of all log entries corresponding to file system requests that modified the metadata contained in the block, to the head of Metadata Log 154. In other words, the single log hold for a block of cached metadata indicates the file system request that modified the metadata contained in the block, and that corresponds to the oldest active log entry in the Metadata Log 154 of all active log entries corresponding to file system requests that modified the metadata contained in the block.

When the blocks of cached metadata in Blocks of Cached Metadata 132 are flushed from Memory 126 to Persistent Storage by Cache Synch Manager 130, the single log hold for each block flushed is released. Log entries are released from the head of the Metadata Log 154 that correspond to file system requests for which all log holds have been released. Those log entries released from the head of Metadata Log 154 are inactivated from Metadata Log 154, such that they are no longer part of the Metadata Log 154, and such that the space previously allocated for the released log entries in Persistent Storage 150 is made available for allocation to store new log entries.

The Request Descriptors/Reference Counts 134 are data structures generated by the Request Manager when processing File System Requests 114. For example, Request Manager 128 may generate a request descriptor for each file system request. The single log hold for a block of cached metadata indicates the request that added the log hold to the block, for example by indicating (e.g. storing a pointer to or name of) the request descriptor for that request. The request descriptor for a file system request may include a reference counter for the file system request. The reference counter for a given file system request is equal to a total number of blocks of cached metadata that have log holds indicating the request. In other words, in the disclosed technique, the reference counter for a given file system request is equal to a total number of blocks of cached metadata that i) are modified by the request, and ii) for which the log entry for the request is located closest to the head of the metadata log with respect to all log entries of file system requests that modify the block.

The Request Manager 128 increments the reference counter in the request descriptor for a file system request each time a log hold is added indicating the request. Each time a log hold is released, either when the Cache Synch Manager 130 releases the single log hold for each block flushed, or when the Request Manager 128 releases a previously added log hold, the reference counter of the request indicated by the log hold is decremented.

Figure 2:
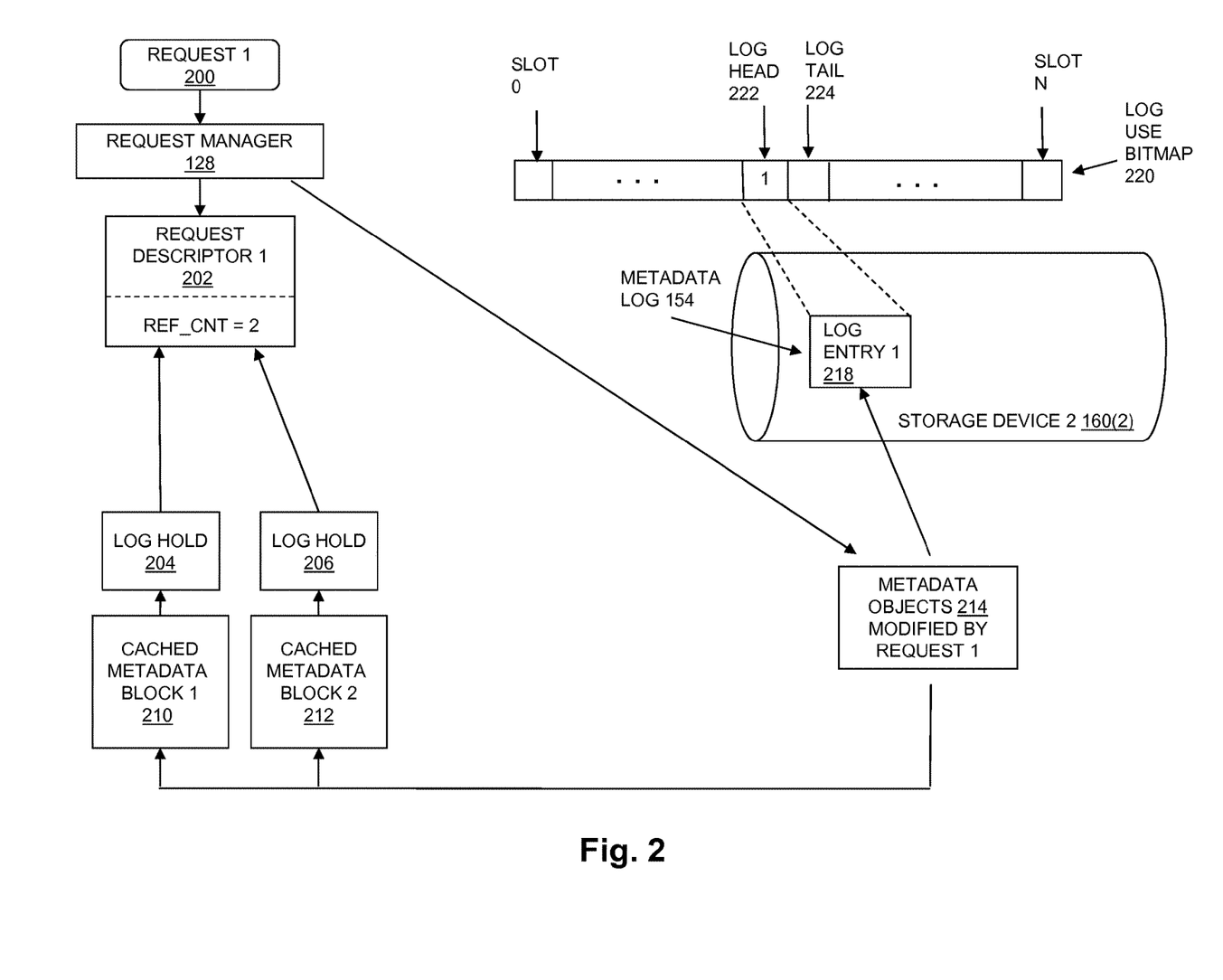
FIG. 2 is a block diagram showing components in an illustrative embodiment, when operating to process a first file system request, where the first file system request modifies metadata in a first and a second block of cached metadata.
Figure 3:
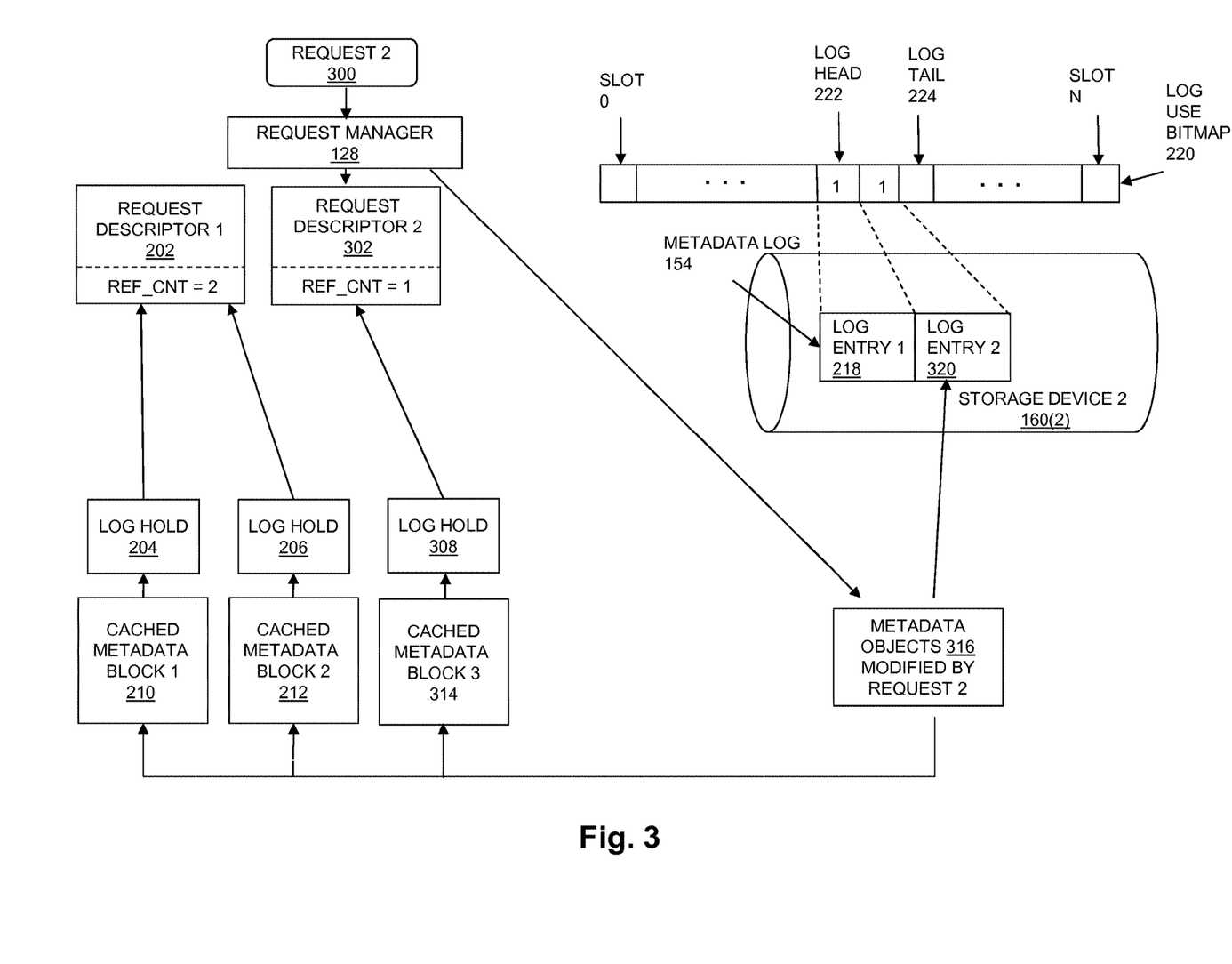
FIG. 3 is a block diagram showing components in an illustrative embodiment, when operating to process a second file system request, where the second file system request modifies metadata in the first and second blocks of cached metadata, and also in a third block of cached metadata.
Figure 4:
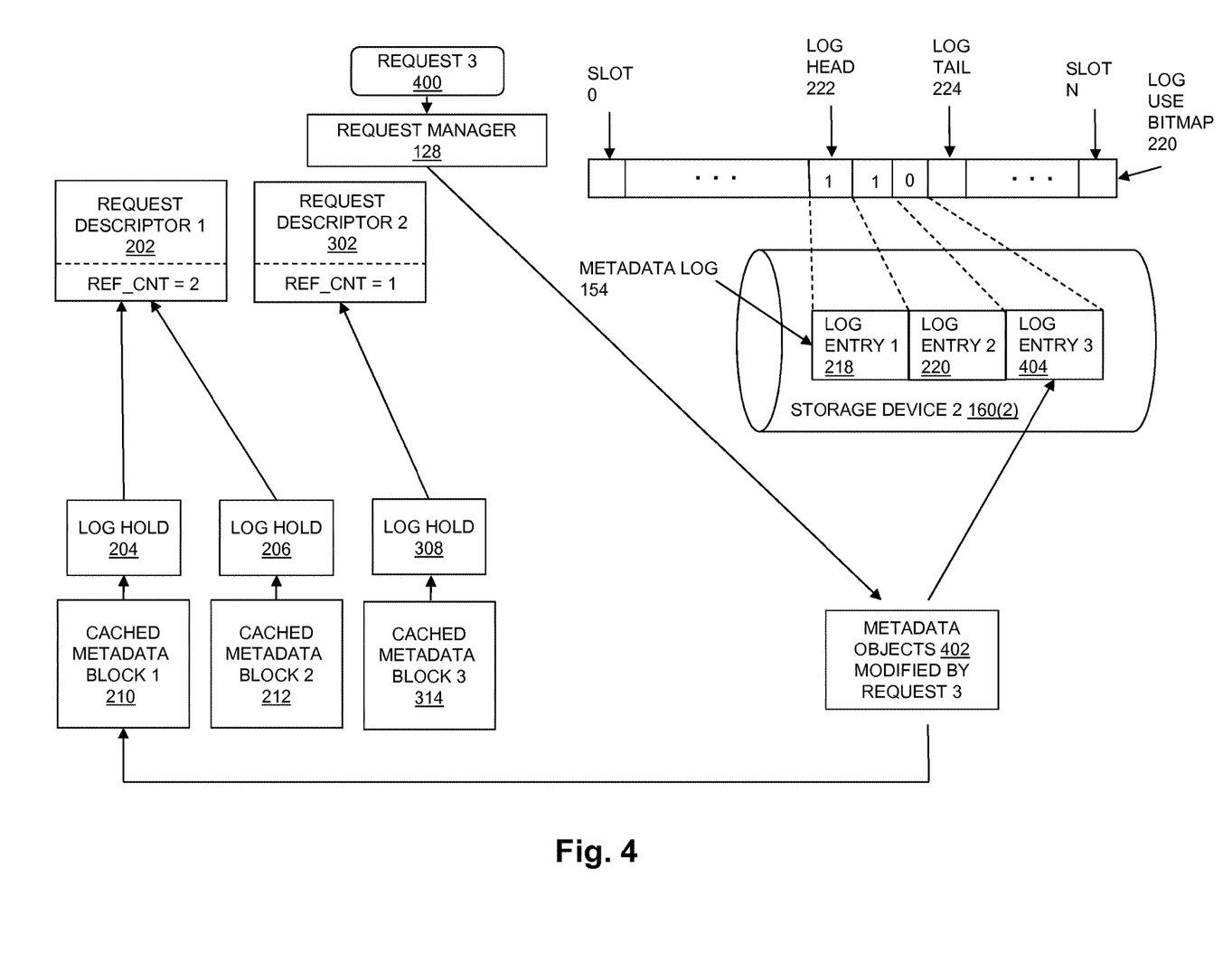
FIG. 4 is a block diagram showing components in an illustrative embodiment, when operating to process a third file system request, where the third file system request modifies metadata only in the first block of cached metadata.

FIGS. 2-4 are block diagrams illustrating operation of an embodiment of the disclosed technique when processing received file system requests. In FIG. 2, an intrusive NFS request (Request 1 200) is received that changes metadata in Cached Metadata Block 1 210 and Cached Metadata Block 2 212. Request Descriptor 1 202 is generated by Request Manager 128 to represent Request 1 200, and space is allocated at the tail of Metadata Log 154 to store a log entry corresponding to Request 1 200. For example, space is allocated to store Log Entry 1 218 using the Log Use Bitmap 220. The Log Use Bitmap 220 includes a number of slots (e.g. slot 0 through slot N), each of which corresponds to a block of space in the Storage Device 2 160(2) that may be allocated to store a log entry in Metadata Log 154. Log Head 222 is a pointer indicating the slot in Log Use Bitmap 220 corresponding to a head of the Metadata Log 154 (i.e. the beginning of Metadata Log 154), and Log Tail 224 is a pointer indicating the slot in Log Use Bitmap 220 corresponding to a tail of the Metadata Log 154 (i.e. space in Storage Device 2 160(2) in which a next log entry may be added to the end of Metadata Log 154). Accordingly, after allocation of space in Storage Device 2 160(2) for Log Entry 1 218, Log Tail 224 points to a slot in Log Use Bitmap 220 that is after the slot corresponding to the space allocated to store Log Entry 1 218, and Log Head 222 points to a slot in Log Use Bitmap 220 corresponding to the block allocated to store Log Entry 1 218, since Log Entry 1 218 is the first log entry added to Metadata Log 154, and is accordingly located at the head of Metadata Log 154.

Further in the embodiment of FIG. 2, each slot in Log Use Bitmap 220 that corresponds to a block storing a log entry currently contained in Metadata Log 154 may store an indication of whether a reference counter for the request corresponding to that log entry is non-zero, and accordingly indicating whether the corresponding block is currently in-use. For example, a value of '1' may be stored in a slot to indicate that a reference counter for the request corresponding to a log entry indicated by that slot is non-zero, and accordingly that the corresponding block is currently in-use. Similarly, a value of '0' may be stored in a slot to indicate that a reference counter for the request corresponding to the log entry indicated by that slot is zero, and accordingly that the corresponding block is not in-use.

After Request Manager 128 writes the Metadata Objects 214 modified by Request 1 200 to Log Entry 1 218, it writes Metadata Objects 214 modified by Request 1 200 to Cached Metadata Block 1 210 and Cached Metadata Block 2 212.

Since there is no previously added log hold associated with either Cached Metadata Block 1 210 or Cached Metadata Block 2 212, Request Manager 128 adds Log Hold 204 to Cached Metadata Block 1 210, and Log Hold 206 to Cached Metadata Block 2 212. Log Hold 204 and Log Hold 206 both indicate Request 1 200, for example by pointing to Request Descriptor 1 202. Request Descriptor 1 202 includes a reference counter (REF_CNT) for Request 1 200. Request Manager 128 increments the reference counter associated with Request 1 200 for each log hold added, i.e. once for Log Hold 204 and once for Log Hold 206, resulting in REF_CNT=2 in Request Descriptor 1 202. The Request Manager 128 stores a '1' in the slot in Log Use Bitmap 220 for Log Entry 1 218, to indicate that the reference counter for Request 1 200 is non-zero.

In FIG. 3, a second intrusive NFS request (Request 2 300) is received that modifies metadata in Cached Metadata Block 1 210, Cached Metadata Block 2 212, and Cached Metadata Block 3 314. Request Manager 128 creates Request Descriptor 2 302 to represent Request 2 300, and space is allocated at the tail of Metadata Log 154 to store a log entry corresponding to Request 2 300 (e.g. Log Entry 2 320), resulting in the Log Tail 224 being advanced to point to a slot located after the slot associated with Log Entry 2 320.

After the Request Manager 128 writes the Metadata Objects 316 modified by Request 2 300 to Log Entry 2 320, it writes the Metadata Objects 316 modified by Request 2 300 to Cached Metadata Block 1 210, Cached Metadata Block 2 212, and Cached Metadata Block 3 314.

Since Cached Metadata Block 1 210 and Cached Metadata Block 2 212 each already have previously added log holds indicating another request (Request 1 200), the Request Manager 128 checks whether the log entry for Request 1 200 (i.e. Log Entry 1 200), is closer to a head of Metadata Log 154 than the log entry for Request 2 300 (i.e. Log Entry 2 320). In response to detecting that Log Entry 1 200 is closer to the head of Metadata Log 154 than Log Entry 2 320, the Request Manager 128 adds no log hold for Request 2 300 to Cached Metadata Block 1 210 or Cached Metadata Block 2 212.

Since no log hold was previously added to Cached Metadata Block 3 314, the Request Manager 128 adds Log Hold 308 to Cached Metadata Block 3 314, where Log Hold 308 indicates Request 2 200 (e.g. by pointing to Request Descriptor 2 302). A reference counter for Request 2 (e.g. REF_CNT in Request Descriptor 2 302) is accordingly incremented once for Log Hold 308, resulting in a reference counter for Request 2 300 of 1 (REF_CNT=1 in Request Descriptor 2 302). The Request Manager 128 stores a '1' in the slot in Log Use Bitmap 220 for Log Entry 2 220, to indicate that the reference counter for Request 2 300 is non-zero.

In FIG. 4, a third intrusive NFS request (Request 3 400) is received that changes metadata only in Cached Metadata Block 1 210. Space is allocated at the tail of Metadata Log 154 for a log entry corresponding to Request 3 400 (e.g. Log Entry 3 404), resulting in the Log Tail 224 being advanced to point to a slot located after the slot associated with the block allocated to store Log Entry 3 404.

After the Request Manager 128 writes the Metadata Objects 402 modified by Request 3 400 to Log Entry 3 404, the Metadata Objects 402 modified by Request 3 400 are written to Cached Metadata Block 1 210. Since Cached Metadata Block 1 210 already has a Log Hold 204 previously added for another request (Request 1 200), the Request Manager 128 checks whether the log entry for Request 1 200 (i.e. Log Entry 1 200), is closer to a head of Metadata Log 154 than the log entry for Request 3 400 (i.e. Log Entry 3 404). Upon detecting that Log Entry 1 200 is closer to the head of Metadata Log 154 than Log Entry 3 404, the Request Manager 128 adds no log hold for Request 3 400 to Cached Metadata Block 1 210. Since no log hold was added for Request 3 400, there is no need to increment a reference counter for Request 3 400, and accordingly the reference counter for Request 3 400 effectively is zero. Moreover, there is no need for a reference counter to be decremented as cache blocks modified by Request 3 400 are flushed, or to generate a request descriptor to store a reference counter for Request 3 400. The Request Manager 128 stores a '0' in the slot in Log Use Bitmap 220 for Log Entry 3 404, to indicate that the reference counter for Request 1 200 is zero.

Figure 5:
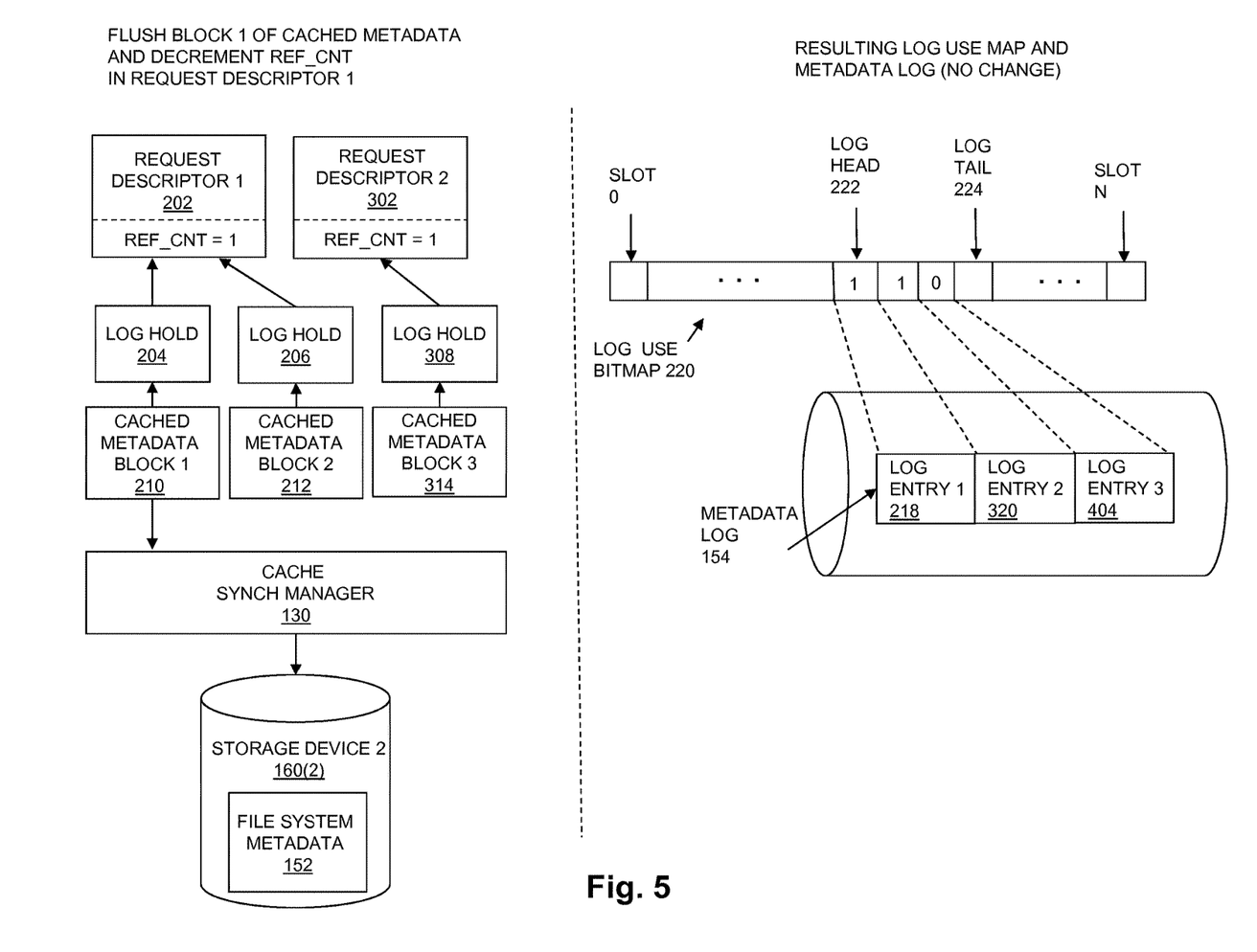
FIG. 5 is a block diagram showing components in an illustrative embodiment, when operating to flush cached metadata from the first block of cached metadata to persistent storage.
Figure 6:
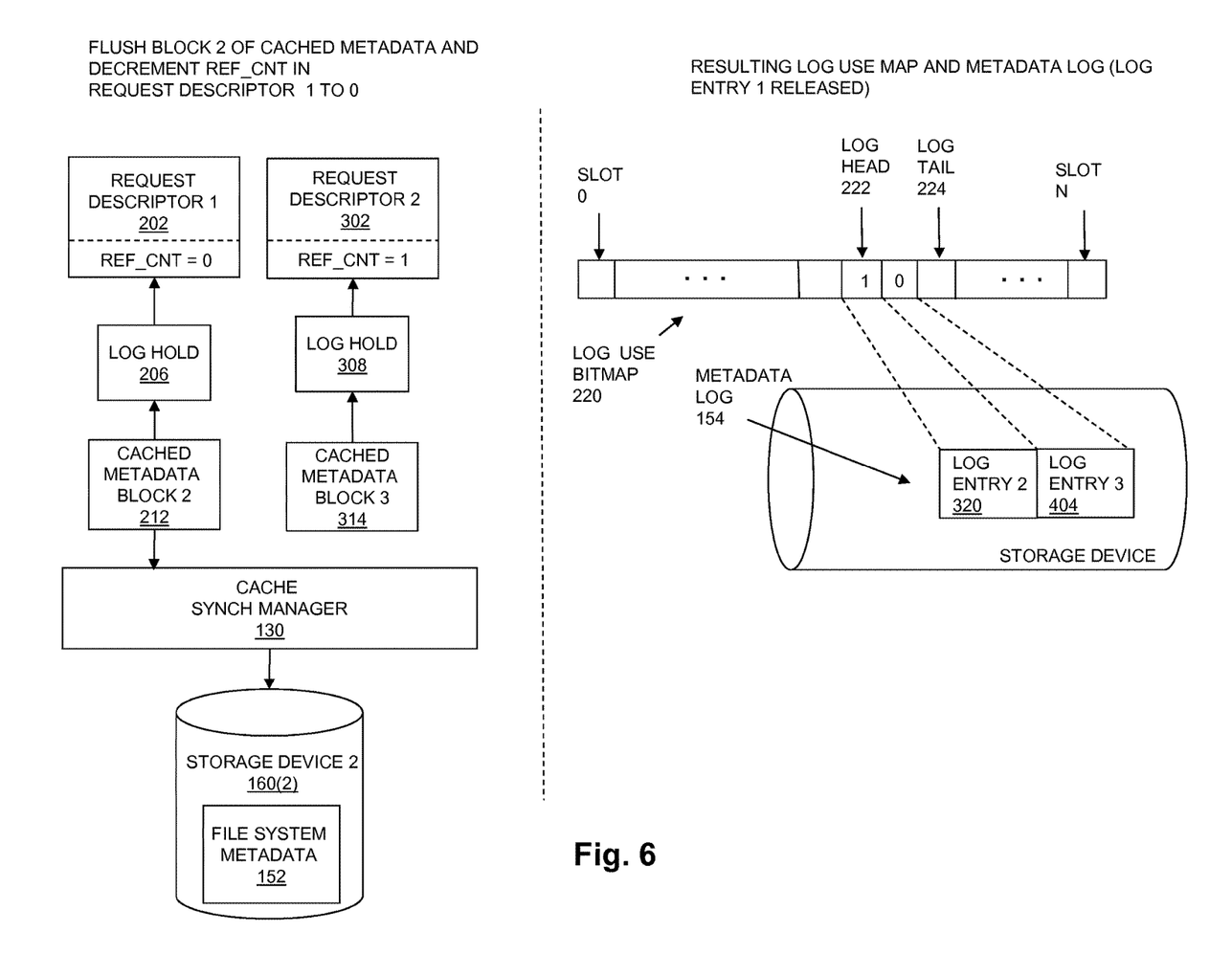
FIG. 6 is a block diagram showing components in an illustrative embodiment, when operating to flush cached metadata from the second block of cached metadata to persistent storage.
Figure 7:
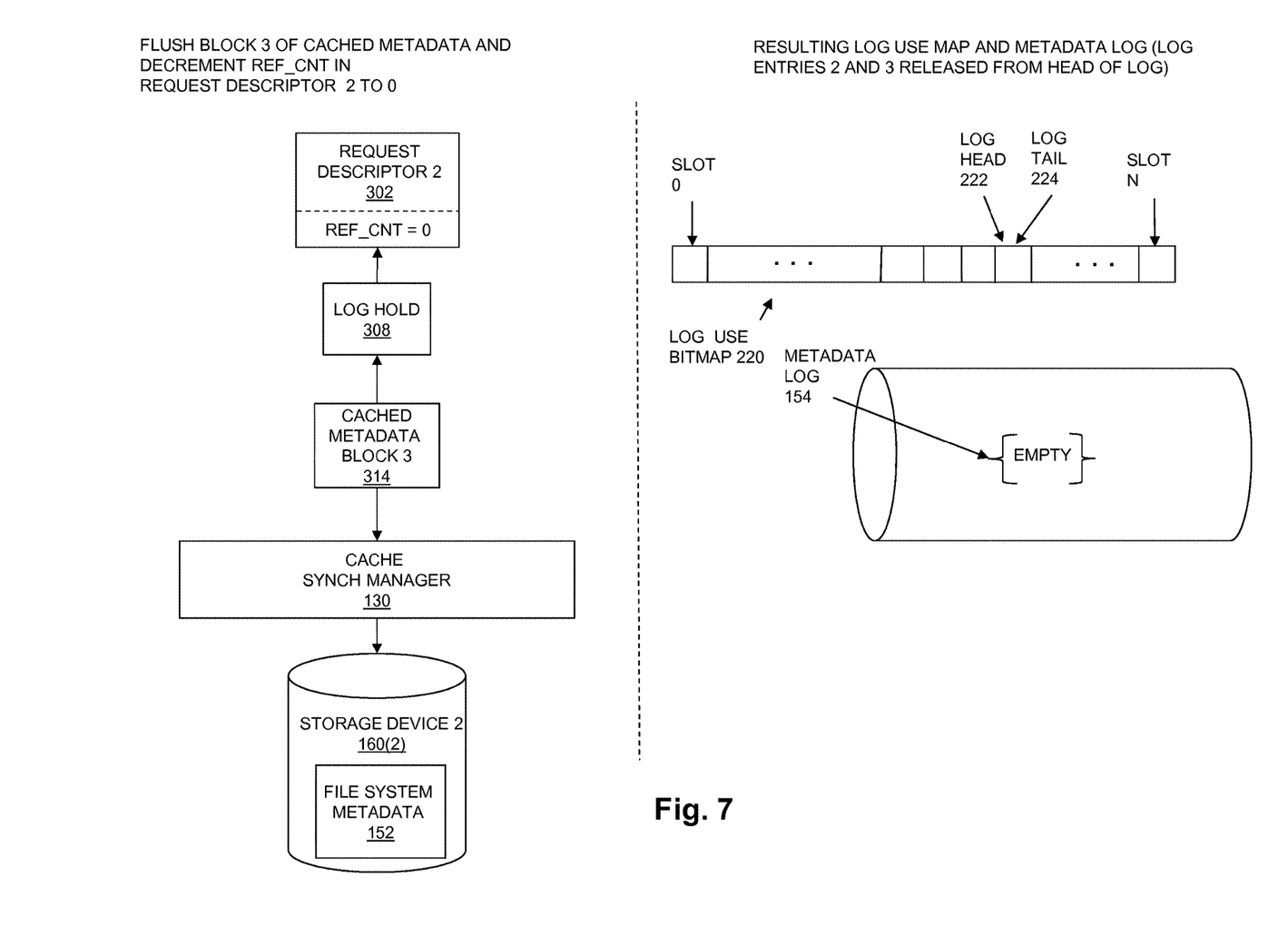
FIG. 7 is a block diagram showing components in an illustrative embodiment, when operating to flush cached metadata from the third block of cached metadata to persistent storage.

FIGS. 5-7 are block diagrams illustrating operation of the embodiment shown in FIGS. 2-4, following the file system request processing described above with reference to FIGS. 2-4. FIGS. 5-7 show an example of operation when flushing cached metadata to persistent storage. In FIG. 5, on the left hand side, a first block of cached metadata (i.e. Cached Metadata Block 1 210) is written (or "flushed") to persistent storage by a metadata cache synchronization process or thread (i.e. Cache Synch Manager 130). When the cached metadata objects from Cached Metadata Block 1 210 are written out to their persistent representation, e.g. within File System Metadata 152, the Cache Synch Manager 130 decrements the reference counter for the request associated with the single Log Hold 204 for Cached Metadata Block 1 210. In FIG. 5, the reference counter for the request associated with the single Log Hold 204 is shown as the REF_CNT in Request Descriptor 1202. The result of the decrement performed when flushing Cached Metadata Block 1 210 is REF_CNT=1 in Request Descriptor 1 202. The disclosed technique then checks the head of the Metadata Log 154 for any log entries corresponding to requests with reference counts of zero. Since the log entry at the head of Metadata Log 154 (Log Entry 1 218) corresponds to Request 1 200, and the result of decrementing the reference counter in Request Descriptor 1 202 is non-zero, there are accordingly no log entries at the head of Metadata Log 154 that correspond to requests with zero reference counts, and therefore no log entry is released as a result of flushing Cached Metadata Block 1 210, as illustrated by the unchanged Log Use Bitmap 220 and Metadata Log 154 shown in the right hand side of FIG. 5.

In FIG. 6, on the left hand side, a second one of the blocks of cached metadata (i.e. Cached Metadata Block 2 212) is flushed to persistent storage by Cache Synch Manager 130. When the cached metadata objects from Cached Metadata Block 2 212 are written out to their persistent representation, e.g. within File System Metadata 152, the Cache Synch Manager 130 decrements the reference counter for the request associated with the single Log Hold 206 for Cached Metadata Block 2 212. In FIG. 6, the reference counter for the request associated with the single Log Hold 206 is shown as the REF_CNT in Request Descriptor 1 202. The result of the decrement performed when flushing Cached Metadata Block 2 212 is REF_CNT=0 in Request Descriptor 1 202. The disclosed technique then checks the head of the Metadata Log 154 for any log entries corresponding to requests with reference counts of zero, so that those log entries can be released. Since after the operations of FIG. 5 the log entry at the head of Metadata Log 154 (Log Entry 1 218) remains Request 1 200, and the result of decrementing the reference counter in Request Descriptor 1 202 is zero, the log entry at the head of Metadata Log 154 (Log Entry 1 218) corresponds to a request with zero reference counts, and may be released. The disclosed technique also checks whether any entries other log entries following Log Entry 1 218 at the head of Metadata Log 154 have zero reference counts, for example based on indications in corresponding slots of Log Use Bit Map 220. Since the log entry following Log Entry 1 218 is Log Entry 2 320, and the slot in Log Use Bitmap 220 for Log Entry 2 320 includes an indication (i.e. a value of '1') that the reference counter for the request corresponding to Log Entry 2 320 is non-zero, the disclosed technique determines that there are no log entries at the head of Metadata Log 154 following Log Entry 1 218 that may be released. Only Log Entry 1 218 is accordingly released from Metadata Log 154 as a result of flushing Cached Metadata Block 2 212, as illustrated by the updated Log Use Bitmap 220 and Metadata Log 154 shown in the right hand side of FIG. 6. Specifically, as shown on the right hand side of FIG. 6, the Log Head 222 has been advanced to indicate a next slot in Log Use Bitmap 220 following the slot corresponding to Log Entry 1 218, corresponding to Log Entry 2 320. The resulting Metadata Log 154 also shown in the right hand side of FIG. 6 includes only Log Entry 2 320 and Log Entry 3 404, with Log Entry 2 320 located at the new head of Metadata Log 154.

In FIG. 7, on the left hand side, a third one of the blocks of cached metadata (i.e. Cached Metadata Block 3 314) is flushed to persistent storage by Cache Synch Manager 130. When the cached metadata objects from Cached Metadata Block 3 314 are written out to their persistent representation, e.g. within File System Metadata 152, the Cache Synch Manager 130 decrements the reference counter for the request associated with the single Log Hold 308 for Cached Metadata Block 3 314. In FIG. 7, the reference counter for the request associated with the single Log Hold 308 is shown as the REF_CNT in Request Descriptor 2 302. The result of the decrement performed when flushing Cached Metadata Block 3 314 is REF_CNT=0 in Request Descriptor 2 302. The disclosed technique then checks the head of the Metadata Log 154 for any log entries corresponding to requests with reference counts of zero, so that such log entries may be released. Since after the operations of FIG. 6 the log entry at the head of Metadata Log 154 (Log Entry 2 320) corresponds to Request 2 300, and the result of decrementing the reference counter in Request Descriptor 2 302 is zero, the log entry at the head of Metadata Log 154 (Log Entry 2 320) corresponds to a request with zero reference counts, and may be released. The disclosed technique also checks whether any log entries following Log Entry 2 320 at the head of Metadata Log 154 have zero reference counts, for example based on indications in corresponding slots of Log Use Bit Map 220. Since the log entry following Log Entry 2 320 is Log Entry 3 404, and the slot in Log Use Bitmap 220 for Log Entry 3 404 includes an indication (i.e. a value of '0') that the reference counter for the request corresponding to Log Entry 3 404 is zero, the disclosed technique determines that Log Entry 3 404 may also be released. Accordingly, Log Entry 2 320 and Log Entry 3 404 are both released from Metadata Log 154 as a result of flushing Cached Metadata Block 3 314, as illustrated by the updated Log Use Bitmap 220 and Metadata Log 154 shown in the right hand side of FIG. 7. Specifically, as shown in the right hand side of FIG. 7, the resulting Log Head 222 has been advanced by two slots to point to the slot after the slot for Log Entry 3 404. The resulting Log Head 222 accordingly points to the same slot as Log Tail 224, since the resulting Metadata Log 154 includes no log entries, and is therefore empty.

Figure 8:
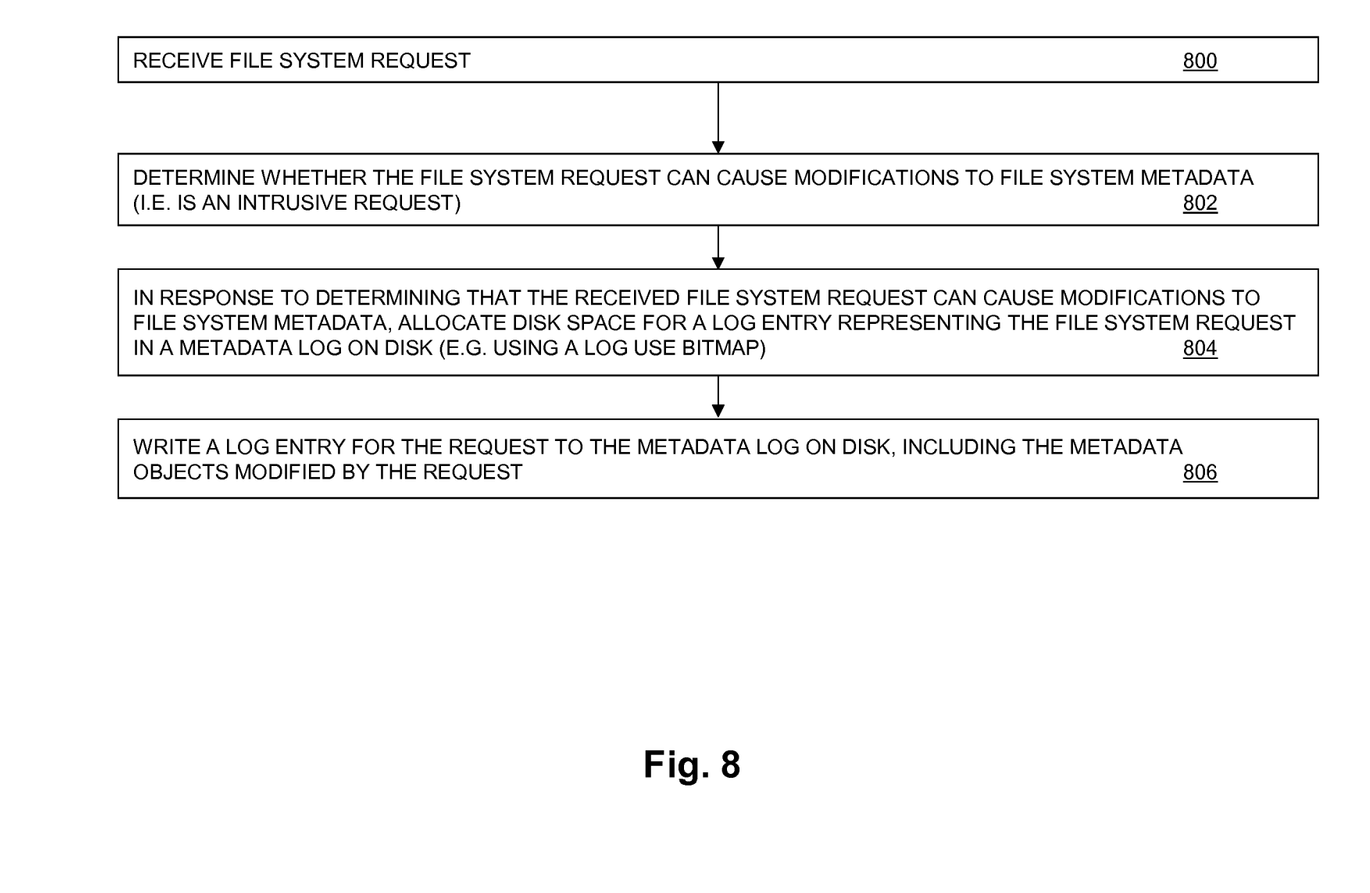
FIG. 8 is a flow chart showing steps performed by an illustrative embodiment to receive a file system request and write a log entry in the metadata log corresponding to the received file system request.

FIG. 8 is a flow chart showing steps performed by an illustrative embodiment to receive a file system request and write a log entry in the metadata log corresponding to the received file system request. The steps shown in FIG. 8 may, for example, be performed by the Request Manager 128 shown in FIG. 1. In step 800, a file system request is received, such as an NFS request. The file system request received at step 800 is referred to herein for purposes of explanation as the "current request." At step 802, the disclosed technique determines whether the current request is an intrusive request. If the current request is an intrusive request, at step 804 the disclosed technique allocates persistent storage space (e.g. disk space) to store a log entry representing the request in a metadata log. Otherwise, if the current request is not an intrusive request, then no log entry needs to be created, since the request cannot modify file system metadata, and the steps of FIG. 8 following step 802, and the steps of FIG. 9, need not be performed. The allocation of space for the log entry performed at step 804 may, for example, be accomplished using a log use bitmap having slots corresponding to blocks of persistent storage that may be allocated to store log entries in the metadata log. At step 806, a log entry corresponding to the current request and information containing the metadata objects modified by the current request is written into the space allocated at step 804. The actual metadata objects are written at a later time.

Figure 9:
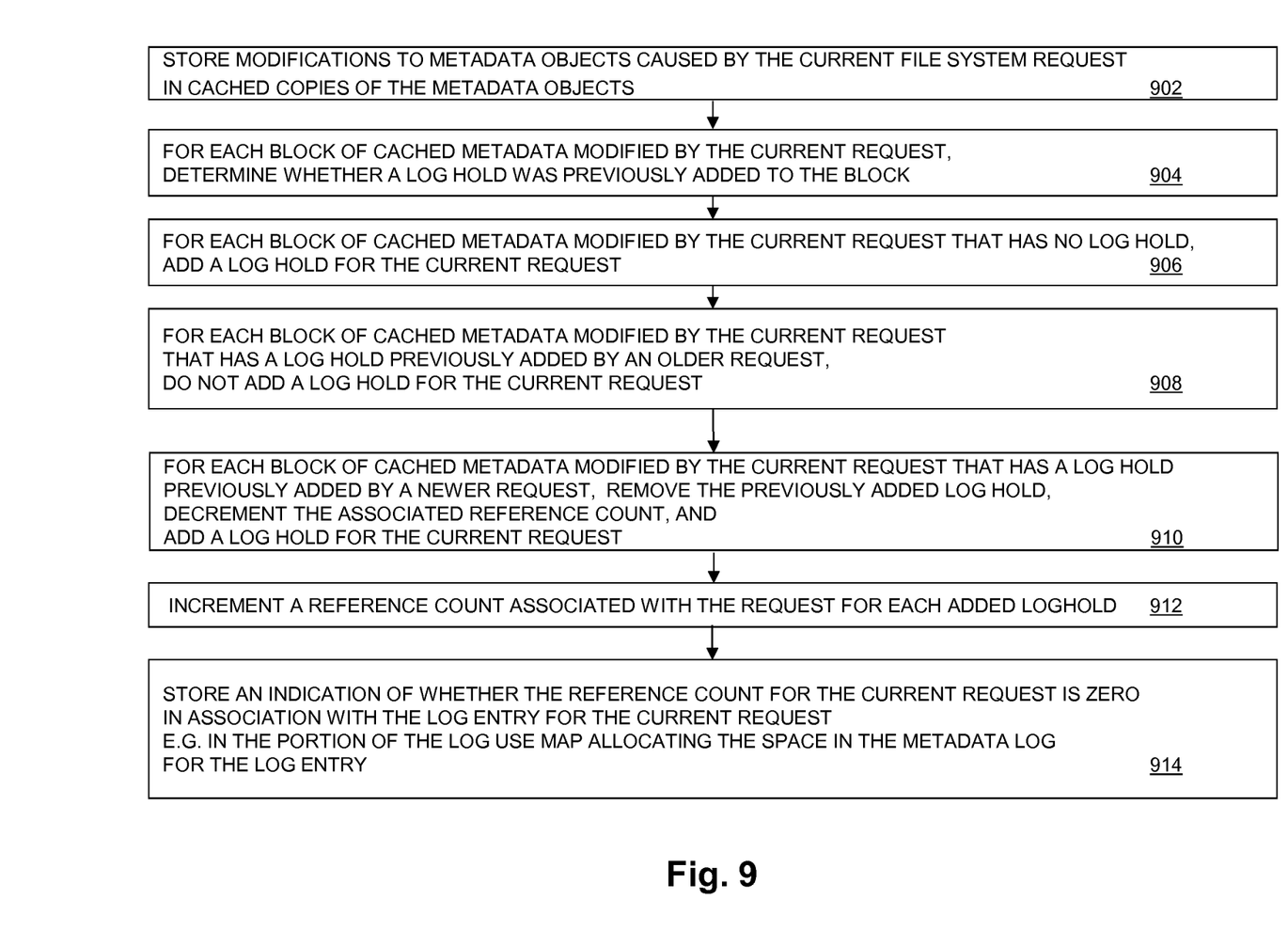
FIG. 9 is a flow chart showing steps performed by an illustrative embodiment to process a current file system request.

FIG. 9 is a flow chart showing steps performed by an illustrative embodiment to process the current file system request received at step 800 of FIG. 8, following completion of the steps shown in FIG. 8. The steps of FIG. 9 may, for example, be performed by the Request Manager 128 shown in FIG. 1. At step 902, the metadata items modified by the current request are stored in blocks of cached metadata. For each block of cached metadata modified by the current request, a determination is made at step 904 as to whether a log hold exists that was previously added to the block. At step 906, for each block of cached metadata modified by the current request that has no previously added log hold, a log hold is added indicating the current request.

At step 908, for each block of cached metadata modified by the current request that has a log hold previously added by an "older" request (i.e. by a request corresponding to a log entry located closer to the head of the metadata log than the log entry corresponding to the current request), the disclosed technique does not add a request to the block for the current request. Accordingly, the single log hold for such a block remains the log hold added by the oldest request that modified the metadata within the block.

At step 910, for each block of cached metadata modified by the current request that has a log hold previously added by a "newer" request (i.e. by a request corresponding to a log entry located farther from the head of the metadata log than the log entry corresponding to the current request), the disclosed technique removes the previously added log hold, decrements the reference counter for the request indicated by the previously added log hold (i.e. the reference counter for the newer request), and adds a log hold indicating the current request.

At step 912, the disclosed technique increments a reference counter associated with the current request for each log hold added indicating the current request in steps 906 and/or 910. At step 914, the disclosed technique stores an indication of whether the reference counter for the current request is zero or non-zero in association with the log entry corresponding to the current request. For example, a slot with a log use bitmap or the like, corresponding to the log entry for the current request, may be used to store such an indication (e.g. a '1' indicating a non-zero reference count, and a '0' indicating a zero reference count).

Figure 10:
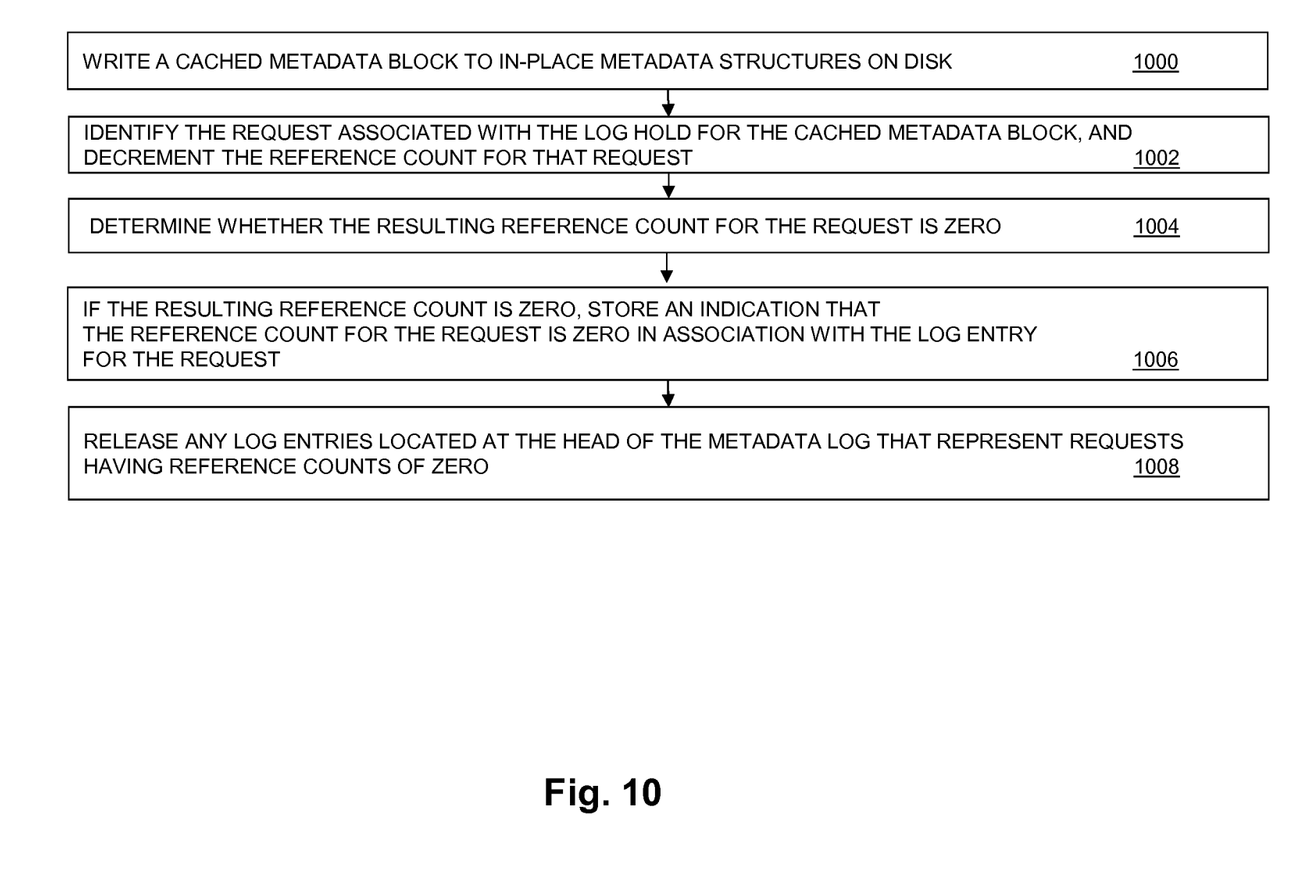
FIG. 10 is a flow chart showing steps performed by an illustrative embodiment to flush a block of cached metadata to persistent storage.

FIG. 10 is a flow chart showing steps performed by an illustrative embodiment to flush a block of cached metadata to persistent storage. The steps of FIG. 10 may, for example be performed by a process or thread such as the Cache Synch Manager 130 shown in FIG. 1. At step 1000, the disclosed technique writes the block of cached metadata to the in-place metadata structures on persistent storage (e.g. File System Metadata 152 in FIG. 1). At step 1002, the disclosed technique identifies the request associated with the single log hold for the flushed block (e.g. by a pointer in the log hold indicating a request descriptor for the associated request), and decrements the reference counter for that request (e.g. in the request descriptor). At step 1004, the disclosed technique determines whether the result of decrementing the reference counter is zero. If the result of decrementing the reference counter is zero, then at step 1006 the disclosed technique stores an indication that the reference counter for the request is zero in association with a log entry for the request, e.g. in a slot corresponding to the log entry in a log use bitmap. At step 1008, the disclosed technique releases all log entries located at the head of the metadata log that represent requests having reference counts of zero (e.g. that have '0' in the corresponding slots of the log use bit map). The head of the metadata log is accordingly advanced to the next log entry in the log corresponding to a request having a non-zero reference count.

Those skilled in the art will recognize that the disclosed technique is significantly more than merely the abstract idea of creating a log hold for a block of cached metadata. Instead, the disclosed technique addresses various technical issues arising in previous technical solutions, including issues arising from previous system's use of individual log holds to represent each metadata modifications made to a block. For example, based on the use of only a single log hold per block of cached metadata, embodiments of the disclosed technique may operate using significantly smaller numbers of log holds that were sometimes used in previous technologies. As a result, system performance may improve as a result of the smaller memory footprint required by the disclosed technique. Additionally, the single log holds used by the disclosed technique allow for more rapid traversal of the log holds, for example when removing the single log hold at the time a block is flushed, thus also improving system performance in terms of central processing unit (CPU) utilization.

While the above description provides examples of embodiments using various specific terms to indicate specific systems, devices, and/or components, such terms are illustrative only, and are used only for purposes of convenience and concise explanation. The disclosed technique is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of logging modifications to file system metadata resulting from file system requests, comprising executing, on at least one processor, the acts of:
   receiving a plurality of file system requests;
   maintaining a metadata log in persistent storage, wherein each log entry in the metadata log contains metadata to be modified by a corresponding one of the plurality of file system requests;
   storing a single log hold for each of a plurality of blocks of cached metadata, the single log hold for each block indicating a file system request that modifies the metadata contained in that block and that corresponds to a log entry that is located the closest, of all log entries corresponding to file system requests that modify the metadata contained in that block, to a head of the metadata log, the storing including—
   i) processing a first one of the file system requests by adding a log hold indicating the first one of the file system requests to a block of cached metadata modified by the request,
   ii) processing a second one of the file system requests, wherein the second one of the file system requests also modifies the block of cached metadata modified by the first one of the file system requests, by not adding a log hold to the block of cached metadata modified by the first one of the file system requests in response to detecting that a location of a log entry corresponding to the first one of the file system requests is closer to the head of the metadata log than a location of a log entry corresponding to the second one of the file system requests, and
   iii) processing a third one of the file system requests, wherein the third one of the file system requests also modifies the block of cached metadata modified by the first one of the file system requests, by, in response to detecting that a location of a log entry corresponding to the third one of the file system requests is closer to the head of the metadata log than the location of a log entry corresponding to the first one of the file system requests,
      a) without releasing the log entry corresponding to the first one of the file system requests from the metadata log, removing the log hold indicating the first one of the file system requests from the block, and
      b) adding a log hold indicating the third one of the file system requests to the block;
flushing the blocks of cached metadata to the persistent storage, wherein the flushing includes releasing the single log hold for each block flushed;
releasing log entries from the metadata log that correspond to individual ones of the file system requests for which all log holds have been released; and
maintaining a reference counter for each file system request, wherein the reference counter for each file system request indicates a total number of blocks of cached metadata that are each both i) modified by the request, and ii) for which the request has a log entry located closer to the head of the metadata log than any other log entry in a plurality of log entries for a plurality of file system requests that modify the block.

2. The method of claim 1, wherein maintaining a reference counter for each file system request includes incrementing the reference counter for each file system request each time a log hold is added indicating the request.

3. The method of claim 1, wherein processing the third one of the file system requests further includes, responsive to removing the log hold indicating the first one of the file system requests from the block, decrementing a reference counter for the first one of the file system requests.

4. The method of claim 1, further comprising:
wherein releasing the single log hold for each block flushed includes decrementing the reference counter of the file system request indicated by the log hold; and
wherein releasing log entries that correspond to file system requests for which all log holds have been released includes identifying file system requests for which all log holds have been released by identifying which of the file system requests have a reference counter of zero.

5. The method of claim 1, further comprising:
wherein log entries are added at a tail of the metadata log; and
wherein releasing log entries that correspond to file system requests for which all log holds have been released includes releasing those log entries located at the head of the metadata log corresponding to file system requests having reference counts of zero.

6. The method of claim 1, wherein the blocks of cached metadata are stored in memory and contain metadata objects modified by file system requests corresponding to log entries in the metadata log.

7. A data storage system, comprising control circuitry that includes a set of processing units coupled to memory, the control circuitry constructed and arranged to:
receive a plurality of file system requests;
maintain a metadata log in persistent storage, wherein each log entry in the metadata log contains metadata to be modified by a corresponding one of the plurality of file system requests;
store a single log hold for each of a plurality of blocks of cached metadata, the single log hold for each block indicating a file system request that modifies the metadata contained in that block and that corresponds to a log entry that is located the closest, of all log entries corresponding to file system requests that modify the metadata contained in that block, to a head of the metadata log, by
   i) processing a first one of the file system requests by adding a log hold indicating the first one of the file system requests to a block of cached metadata modified by the request,
   ii) processing a second one of the file system requests, wherein the second one of the file system requests also modifies the block of cached metadata modified by the first one of the file system requests, by not adding a log hold to the block of cached metadata modified by the first one of the file system requests in response to detecting that a location of a log entry corresponding to the first one of the file system requests is closer to the head of the metadata log than a location of a log entry corresponding to the second one of the file system requests, and
   iii) processing a third one of the file system requests, wherein the third one of the file system requests also modifies the block of cached metadata modified by the first one of the file system requests, by, in response to detecting that a location of a log entry corresponding to the third one of the file system requests is closer to the head of the metadata log than the location of a log entry corresponding to the first one of the file system requests,
      a) without releasing the log entry corresponding to the first one of the file system requests from the metadata log, removing the log hold indicating the first one of the file system requests from the block, and
      b) adding a log hold indicating the third one of the file system requests to the block;
flush the blocks of cached metadata to the persistent storage by, at least in part, releasing the single log hold for each block flushed;
release log entries from the metadata log that correspond to individual ones of the file system requests for which all log holds have been released; and
maintain a reference counter for each file system request, wherein the reference counter for each file system request indicates a total number of blocks of cached metadata that are each both i) modified by the request, and ii) for which the request has a log entry located closer to the head of the metadata log than any other log entry in a plurality of log entries for a plurality of file system requests that modify the block.

8. The data storage system of claim 7, wherein the control circuitry is further constructed and arranged to maintain a reference counter for each file system request by, at least in part, incrementing the reference counter for each file system request each time a log hold is added indicating the request.

9. The data storage system of claim 7, wherein the control circuitry is further constructed and arranged to process the third one of the file system requests by, responsive to removing the log hold indicating the first one of the file system requests from the block, decrementing a reference counter for the first one of the file system requests.

10. The data storage system of claim 7, wherein the control circuitry is further constructed and arranged to:
 release the single log hold for each block flushed by, at least in part, decrementing the reference counter of the file system request indicated by the log hold; and
 release log entries that correspond to file system requests for which all log holds have been released by, at least in part, identifying file system requests for which all log holds have been released by identifying which of the file system requests have a reference counter of zero.

11. The data storage system of claim 7, further comprising:
 wherein log entries are added at a tail of the metadata log; and
 wherein the control circuitry is further constructed and arranged to release log entries that correspond to file system requests for which all log holds have been released by, at least in part, releasing those log entries located at the head of the metadata log corresponding to file system requests having reference counts of zero.

12. The data storage system of claim 7, wherein the blocks of cached metadata are stored in memory and contain metadata objects modified by file system requests corresponding to log entries in the metadata log.

13. A computer program product including a set of non-transitory, computer-readable media having instructions which, when executed by control circuitry of a data storage system, cause the control circuitry to perform a method of logging modifications to file system metadata resulting from file system requests, the method comprising:
 receiving a plurality of file system requests;
  maintaining a metadata log in persistent storage, wherein each log entry in the metadata log contains metadata to be modified by a corresponding one of the plurality of file system requests;
  storing a single log hold for each of a plurality of blocks of cached metadata, the single log hold for each block indicating a file system request that modifies the metadata contained in that block and that corresponds to a log entry that is located the closest, of all log entries corresponding to file system requests that modify the metadata contained in that block, to a head of the metadata log, the storing including—
   i) processing a first one of the file system requests by adding a log hold indicating the first one of the file system requests to a block of cached metadata modified by the request,
   ii) processing a second one of the file system requests, wherein the second one of the file system requests also modifies the block of cached metadata modified by the first one of the file system requests, by not adding a log hold to the block of cached metadata modified by the first one of the file system requests in response to detecting that a location of a log entry corresponding to the first one of the file system requests is closer to the head of the metadata log than a location of a log entry corresponding to the second one of the file system requests, and
   iii) processing a third one of the file system requests, wherein the third one of the file system requests also modifies the block of cached metadata modified by the first one of the file system requests, by, in response to detecting that a location of a log entry corresponding to the third one of the file system requests is closer to the head of the metadata log than the location of a log entry corresponding to the first one of the file system requests,
    a) without releasing the log entry corresponding to the first one of the file system requests from the metadata log, removing the log hold indicating the first one of the file system requests from the block, and
    b) adding a log hold indicating the third one of the file system requests to the block;
  flushing the blocks of cached metadata to the persistent storage, wherein the flushing includes releasing the single log hold for each block flushed;
  releasing log entries from the metadata log that correspond to individual ones of the file system requests for which all log holds have been released; and
  maintaining a reference counter for each file system request, wherein the reference counter for each file system request indicates a total number of blocks of cached metadata that are each both i) modified by the request, and ii) for which the request has a log entry located closer to the head of the metadata log than any other log entry in a plurality of log entries for a plurality of file system requests that modify the block.

14. The method of claim 1, wherein the single log hold stored for each block of cached metadata indicates the file system request that corresponds to a log entry that is the oldest log entry in the metadata log of a plurality of log entries corresponding to respective ones of a plurality of file system requests that modify the metadata contained in that block.

15. The method of claim 1, wherein adding the log hold indicating the third one of the file system requests to the block of cached metadata includes adding a log hold that includes a pointer to a request descriptor for the third one of the file system requests;
 wherein the request descriptor for the third one of the file system requests includes a reference counter for the third one of the file system requests; and
 wherein the reference counter for the third one of the file system requests stores a total number of blocks of cached metadata that have log holds indicating the request descriptor for the third one of the file system requests.

16. The method of claim 1, wherein receiving the file system requests comprises receiving the file system requests by a storage system over a communication network from at least one client machine; and wherein the file system metadata comprises file system metadata objects generated by the storage system while providing a file-based storage service to the client machine.

17. The method of claim 16, wherein maintaining the metadata log in persistent storage comprises storing the metadata log in a non-volatile storage device of the data storage system; and wherein storing the single log hold for each of the blocks of cached metadata comprises storing the single log hold for each of the blocks of cached metadata in a memory of the data storage system.

18. The method of claim 1, further comprising storing an indication of each non-zero reference counter in association with the log entry for the file system request for which the non-zero reference number is maintained.

19. The method of claim 1, further comprising:

for each file system request, generating a request descriptor that represents the file system request; and wherein maintaining the reference counter for each file system request further comprises storing the reference counter for each file system request in the request descriptor that represents the file system request.

\* \* \* \* \*